United States Patent Office 3,111,520
Patented Nov. 19, 1963

3,111,520
ALKYLIDENE DERIVATIVES OF 6-PTERIDINE-
HYDRAZIDES AND AMIDRAZONES
Joseph Weinstock, Phoenixville, Pa., assignor to Smith Kline & French Laboratories, Philadelphia, Pa., a corporation of Pennsylvania
No Drawing. Filed Dec. 5, 1960, Ser. No. 73,533
5 Claims. (Cl. 260—251.5)

This invention relates to novel alkylidene derivatives of 6-pteridinehydrazides and amidrazones having useful diuretic and natriuretic activity. In addition these derivatives have hypotensive activity. These derivatives are also useful intermediates in the preparation of other compounds having the above described therapeutic activity as will be described herebelow.

The novel pteridinehydrazide and amidrazone derivatives of this invention are represented by the following structural formula:

FORMULA I

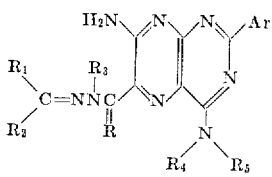

when:

Ar represents

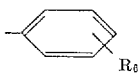

thienyl or pyridyl;
R represents O or NH;
$R_1$ represents hydrogen, lower alkyl,

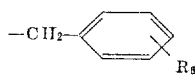

or furyl;
$R_2$ represents lower alkyl,

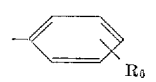

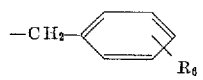

or furyl;
$R_3$, $R_4$ and $R_5$ represent hydrogen or lower alkyl; and
$R_6$ represents hydrogen, chloro, bromo, fluoro, methyl, methoxy, trifluoromethyl, hydroxy or amino.

Advantageous compounds of this invention are represented by the following formula:

FORMULA II

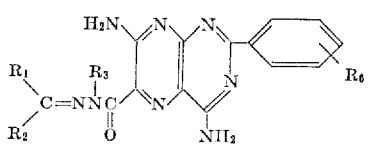

when:

$R_1$ represents hydrogen or lower alkyl;
$R_2$ represents lower alkyl or

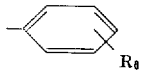

$R_3$ represents hydrogen or methyl; and
$R_6$ represents hydrogen, chloro, methyl, methoxy, trifluoromethyl, hydroxy or amino.

Preferred compounds of this invention are those of Formula II in which $R_3$ is methyl and $R_6$ is hydrogen.

The term "lower alkyl" where used herein denotes groups having a maximum of 4 carbon atoms, preferably not more than 2 carbon atoms.

The alkylidene derivatives of 6-pteridinehydrazides and amidrazones of this invention are prepared by the following procedure:

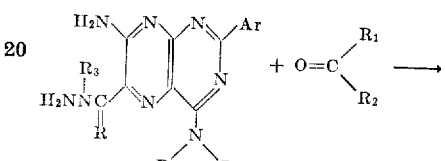

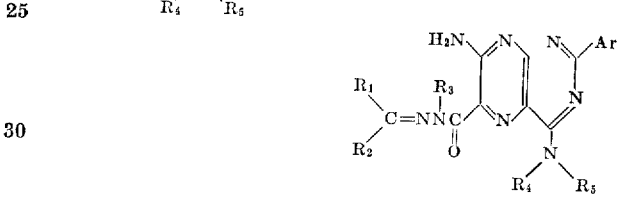

The terms Ar, R, $R_{1-5}$ are as defined in Formula I.

The 6-pteridinehydrazide and the 6-pteridineamidrazone starting materials are prepared as fully described in U.S. Patent No. 2,963,480 issued on December 6, 1960. Briefly the pteridinehydrazides are prepared by reacting a 6-pteridinecarboxylic ester, preferably the methyl or ethyl ester, with hydrazine or an alkylhydrazine in an hydroxylated polar organic solvent having less than 6 carbon atoms such as ethoxyethanol, methoxyethanol, ethylene glycol or propylene glycol at elevated temperatures such as from about 70–200° C., preferably about 90–150° C. for from about 10 minutes to 8 hours. The resulting hydrazides often separate upon cooling and are isolated by filtration. The carboxylic ester starting material is prepared by reacting a 4,6-diamino-2-aryl-5-nitrosopyrimidine with a cyanoacetic acid ester as described more fully hereafter in the examples.

The amidrazone derivatives are prepared by reacting a 6-cyanopteridine derivative with a hydrazine in a lower alcohol such as methanol or ethanol usually at reflux. Dilution with water separates the desired amidrazone derivative. The 6-cyanopteridine starting material is prepared by condensing a 4,6-diamino-2-aryl-5-nitrosopyrimidine with malononitrile by heating in a liquid tertiary amine such as pyridine at temperatures above 50° C. for from about 1–12 hours as described more fully hereafter in the examples.

The alkylidene derivatives of 6-pteridinehydrazides and amidrazones of this invention are prepared by reacting a 6-pteridinehydrazide or a 6-pteridineamidrazone with at least one molar equivalent and preferably an excess of an aldehyde or ketone. The reaction is carried out in an aqueous lower alcohol solution such as ethanol, methanol or isopropanol at about 45–85° C. for from about 10–30 minutes. The resulting 1-alkylidene(or aralkylidene)-2-(6-pteridinecarbonyl or -carboximidoyl)hydrazine usually separates from the reaction mixture on cooling and is isolated by filtration.

The compounds of Formula I in which $R_3$ is lower alkyl are prepared as follows. The 6-pteridinecarbonyl or carboximidoyl hydrazine starting material, as obtained as described above by the reaction of a 6-pteridinecarboxylic ester or a 6-cyanopteridine with an alkylhydrazine, is a mixture of 1- and 2-alkylhydrazine isomers. This mixture of isomers is treated with an aldehyde or ketone in aqueous lower alcohol solution as described hereabove. On cooling the desired 1-alkylidene (or aralkylidene)-2-(6-pteridinecarbonyl or -carboximidoyl)-2-lower alkylhydrazine precipitates from the reaction mixture and is isolated by filtration.

The pharmaceutically acceptable, acid addition salts of the compounds of this invention formed with nontoxic acids such as hydrochloric, sulfuric, methylsulfonic, phosphoric, etc. acid can be used alternatively with the parent compounds. These salts can be prepared advantageously by reacting the bases with the desired acid in a lower alcohol then evaporating the alcohol solvent to leave the salt. Alternatively the salt formation is carried out in an aqueous slurry or solution.

The compounds of this invention are intermediates for the preparation of the corresponding alkyl and aralkyl derivatives which have diuretic, natriuretic and hypotensive activity, the alkyl hydrazines having particularly advantageous activity. Reduction of the alkylidene and aralkylidene compounds is accomplished with a bimetallic hydride such as sodium borohydride in aqueous lower alcohol such as methanol or ethanol at about 25–35° C. The reaction mixture is acidified with concentrated hydrochloric acid and filtered to give the 1-alkyl (and aralkyl)-2-(6-pteridinecarbonyl and -carboximidoyl)hydrazine derivatives.

The following examples are not limiting but are illustrative of compounds of this invention and will make fully apparent all of the compounds embraced by the general formula given above.

Example 1

To a boiling solution of 6.45 g. of 4,6-diamino-2-phenyl-5-nitrosopyrimidine in 400 ml. of methanol is added 2.94 ml. of methyl cyanoacetate and then 1.78 g. of sodium methoxide. The resulting mixture is refluxed for one hour. Yellow crystals are collected by filtration of the hot mixture and extracted with 300 ml. of boiling water. Recrystallization from dimethylformamide yields yellow crystals of methyl 4,7-diamino-2-phenyl-6-pteridinecarboxylate, M.P. about 286° C.

Methylhydrazine (5.0 g.) is added to a refluxing solution of 3.0 g. of methyl 4,7-diamino-2-phenyl-6-pteridinecarboxylate in 300 ml. of 2-ethoxyethanol. The resulting mixture is refluxed for 10 minutes. Cooling, then filtering and recrystallizing the precipitate from aqueous dimethylformamide gives a mixture of 4,7-diamino-2-phenyl-6-pteridinecarboxylic acid 2-methylhydrazide and the corresponding 1-methylhydrazide.

Benzaldehyde (4.2 g.) is added to 6.2 g. of 4,7-diamino-2-phenyl-6-pteridinecarboxylic acid 1- (and 2-)methylhydrazide in 200 ml. of ethanol and 40 ml. of water. The resulting mixture is heated on a steam bath for 20 minutes, then cooled and filtered. The solid product is washed with ethanol and recrystallized from aqueous dimethylformamide to give 1-benzylidene-2-(4,7-diamino-2-phenyl-6-pteridinecarbonyl)-2-methylhydrazine.

Example 2

A mixture of 2.0 g. of methyl 4,7-diamino-2-phenyl-6-pteridinecarboxylate, made as in Example 1, in 200 ml. of ethylene glycol is treated with 4.5 g. of hydrazine. The resulting mixture is heated at 150–160° C. for 30 minutes. Cooling, diluting with water, filtering off the solid and recrystallizing from aqueous dimethylformamide gives 4,7-diamino-2-phenyl-6-pteridinecarboxylic acid hydrazide.

Benzaldehyde (7.33 g.) is added to 10.2 g. of 4,7-diamino-2-phenyl-6-pteridinecarboxylic acid hydrazide in 400 ml. of ethanol and 75 ml. of water. The mixture is heated at 80–85° C. for 20 minutes, cooled in ice and filtered. Washing the solid with ethanol and recrystallizing from aqueous dimethylformamide gives 1-benzylidene-2-(4,7-diamino-2-phenyl - 6 - pteridinecarbonyl)hydrazine, M.P. 336–340° C. (dec.).

A solution of the above prepared pteridinecarbonylhydrazine is reacted with one equivalent of hydrochloric acid in ethanol. Evaporation in vacuo gives the hydrochloride salt.

Example 3

To a stirred solution of 9.55 g. of p-chlorobenzamidine hydrochloride in 200 ml. of methanol is added, slowly, 11.1 g. of the silver salt of isonitrosomalononitrile. The resulting mixture is stirred for one hour and filtered. The filtrate is evaporated to dryness at 30–35° C. To the residue is added 150 ml. of a solution of 5-ethyl-2-methylpyridine and 2-picoline (2:1). The resulting solution is refluxed for 20 minutes. Addition of water and ethanol precipitates a dark green solid which is isolated by filtration and washed with ethanol to give 4,6-diamino-2-(p-chlorophenyl)-5-nitrosopyrimidine.

A refluxing solution of 7.8 g. of the above prepared pyrimidine in 500 ml. of methanol is treated with 2.8 g. of methyl cyanoacetate and 1.78 g. of sodium methoxide, then refluxed for one hour. Working up as in Example 1 yields methyl 4,7-diamino-2-(p-chlorophenyl)-6-pteridinecarboxylate.

Methylhydrazine (4 g.) is added to a refluxing solution of 2 g. of the carboxylate in 250 ml. of 2-ethoxyethanol. After a reflux period of 1 hour, cooling separates 4,7-diamino-2-(p-chlorophenyl)-6-pteridinecarboxylic acid 1- (and 2-)methylhydrazide.

A mixture of 7.9 g. of 4,7-diamino-2-(p-chlorophenyl)-6-pteridinecarboxylic acid 1- (and 2-)methylhydrazide, 4.2 g. of benzaldehyde, 250 ml. of ethanol and 50 ml. of water is heated at 85° C. for 30 minutes. Cooling and filtering gives 1-benzylidene-2-[4,7-diamino-2-(p-chlorophenyl)-6-pteridinecarbonyl]-2-methylhydrazine.

Example 4

A solution of 4.65 g. of p-anisamidine hydrochloride in 50 ml. of methanol is treated with 5.55 g. of the silver salt of isonitrosomalononitrile and the resulting mixture is stirred for one hour. The mixture is filtered and the filtrate concentrated to dryness in vacuo at 30–40° C. The residual solid is boiled for five minutes in 30 ml. of 5-ethyl-2-methylpyridine. The solution is cooled, diluted with ethanol and filtered. The dark green solid obtained is 4,6-diamino-2-(p-methoxyphenyl)-5-nitrosopyrimidine, M.P. 278° C. (dec.).

Treatment of a methanol solution of the above prepared pyrimidine with methyl cyanoacetate and sodium methoxide gives methyl 4,7-diamino-2-(p-methoxyphenyl)-6-pteridinecarboxylate.

A mixture of 2 g. of the ester, a 2 g. of hydrazine and 200 ml. of methoxy ethanol is heated at reflux for 4 hours. The desired 4,7-diamino-2-(p-methoxyphenyl)-6-pteridinecarboxylic acid hydrazide separates upon cooling.

Benzaldehyde (2.1 g.) is added to a mixture of 3.2 g. of 4,7-diamino-2-(p-methoxyphenyl)-6-pteridinecarboxylic acid hydrazide, 150 ml. of ethanol and 35 ml. of water. The mixture is heated on a steam bath for 20 minutes. Cooling and filtering gives 1-benzylidene-2-[4,7-diamino-2-(p-methoxyphenyl)-6-pteridinecarbonyl]-hydrazine.

Example 5

A mixture of 5.91 g. of 4,7-diamino-2-phenyl-6-pteridinecarboxylic acid hydrazide, prepared as in Example 2, 200 ml. of ethanol and 25 ml. of water is treated with 50 ml. of acetone. Heating on a steam bath for 25 minutes with occasional stirring, then cooling and filtering gives yellow crystals of 1-isopropylidine-2-(4,7-diamino-2-phenyl - 6 - pteridinecarbonyl)hydrazine, M.P. 300–301° C. (dec.).

The above prepared hydrazine is treated with an equivalent amount of hydrochloric acid in ethanol to give, after evaporation in vacuo, the hydrochloride salt.

Example 6

Dry hydrogen chloride is passed into a cooled solution of 54.5 g. of 3-thiophenecarbonitrile in 75 ml. of absolute ethanol and the resulting solution is allowed to stand for 48 hours. To the solid is added portionwise an 8% solution of dry ammonia in absolute ethanol containing 12 g. of ammonia. The reaction mixture is shaken for 24 hours, allowed to stand for 48 hours and filtered. The filtrate is allowed to evaporate to dryness in the open air. The residue is dissolved in water. The aqueous solution is acidified with concentrated hydrochloric acid, treated with charcoal, filtered and concentrated. The crystals which form are isolated by filtration to give 3-thiophenecarboxamidine hydrochloride.

To a solution of 8.1 g. of 3-thiophenecarboxamidine hydrochloride in 80 ml. of methyl alcohol is added 11.1 g. of the silver salt of isonitrosomalonitrile. The resulting mixture is stirred for 30 minutes and filtered. The filtrate is evaporated to dryness in vacuo. The residue is refluxed with 50 ml. of 5-ethyl-2-methylpyridine for twenty minutes. The mixture is cooled, diluted with 100 ml. of ethanol and filtered to give 4,6-diamino-5-nitroso-2-(3-thienyl)-pyrimidine.

To a refluxing solution of 4.4 g. of 4,6-diamino-5-nitro-2-(3-thienyl)-pyrimidine in 300 ml. of methanol is added 1.9 g. of methyl cyanoacetate and 1.2 g. of sodium methoxide. The resulting solution is refluxed for one hour. The hot solution is filtered. The solid material is extracted with hot water and recrystallized from dimethylformamide to give methyl 4,7-diamino-2-(3-thienyl)-6-pteridinecarboxylate.

A mixture of 5 g. of the carboxylate, 8.0 g. of butylhydrazine and 250 ml. of ethoxyethanol is heated at reflux for 3 hours. Cooling separates a mixture of 4,7-diamino-2-(3-thienyl)-6-pteridinecarboxylic acid 1-(and 2-)butylhydrazide.

A mixture of 3.5 g. of 4,7-diamino-2-(3-thienyl)6-pteridinecarboxylic acid 1-(and 2-)butylhydrazide, 30 ml. of acetone, 100 ml. of ethanol and 15 ml. of water is heated with stirring on a steam bath for 30 minutes. Cooling and filtering gives 1-isopropylidene-2-[4,7-diamino-2-(3-thienyl)-6-pteridinecarbonyl]-2-butylhydrazine which is recrystallized from aqueous dimethylformamide.

Example 7

Treatment of 54.5 g. of 2-thiophenecarbonitrile in ethanol solution with dry hydrogen chloride and subsequently with an ethanolic solution of ammonia and working up as in Example 6 yields 2-thiophenecarboxamidine hydrochloride.

The above prepared hydrochloride (4.0 g.) is reacted with 5.6 g. of the silver salt of isonitrosomalononitrile in methanol solution and cyclized by subsequent refluxing with 35 ml. of 5-ethyl-2-methylpyridine as in Example 5 to give 4,6-diamino-5-nitroso-2-(2-thienyl)-pyrimidine.

This pyrimidine (4.4 g.) in 350 ml. of refluxing n-propanol is treated with 2.5 g. of n-propyl cyanoacetate (prepared by refluxing cyanoacetic acid with n-propanol and concentrated sulfuric acid) and 1.2 g. of sodium methoxide. The mixture is refluxed for one hour. Crystals are filtered from the hot solution, extracted with hot water and recrystallized from dimethylformamide to give n-propyl 4,7-diamino-2-(2-thienyl)-6-pteridinecarboxylate.

A mixture of 500 mg. of the carboxylate, 1 g. of propylhydrazine and 50 ml. of ethoxyethanol is heated at reflux for 1 hour. Cooling gives the desired 4,7-diamino-2-(2-thienyl)-6-pteridinecarboxylic acid propylhydrazide.

Heating the above prepared propylhydrazides (3.4 g.) with 2.5 g. of phenylacetaldehyde, 100 ml. of ethanol and 20 ml. of water at 80–90° C. for 20 minutes gives, upon cooling and filtering, 1-(β-phenylethylidene)-2-[4,7-diamino-2-(2-thienyl)-6-pteridinecarbonyl]-2-propylhydrazine.

Example 8

To a solution of 8.5 g. of m-toluamidine hydrochloride in 80 ml. of methanol is added 11.1 g. of the silver salt of isonitrosomalononitrile. The mixture is stirred for one hour, filtered and the filtrate concentrated to dryness in vacuo. The residue is refluxed with a mixture of 100 ml. of 5-ethyl-2-methylpyridine and 50 ml. of 2-picoline and worked up as described above to give 4,6-diamino-5-nitroso-2-(m-tolyl)-pyrimidine.

Sodium methoxide (1.78 g.) is added to a refluxing solution of 6.87 g. of 4,6-diamino-5-nitroso-2-(m-tolyl)-pyrimidine and 2.8 g. of methyl cyanoacetate in 400 ml. of methanol. The resulting mixture is refluxed for 45 minutes. Crystals are collected by filtering the hot mixture. Washing with hot water and recrystallizing from dimethylformamide gives methyl 4,7-diamino-2-(m-tolyl)-6-pteridinecarboxylate.

A mixture of 3 g. of the ester, 4 g. of hydrazine and 400 ml. of methoxymethanol is heated at reflux for 2 hours then cooled to give 4,7-diamino-2-(m-tolyl)-6-pteridinecarboxylic acid hydrazide.

p-Chlorobenzaldehyde (2.7 g.) is added to a mixture of 3.1 g. of 4,7-diamino-2-(m-tolyl)-6-pteridinecarboxylic acid hydrazide, 150 ml. of ethanol and 25 ml. of water. The resulting mixture is heated on a steam bath for 20 minutes, then cooled and filtered to give 1-p-chlorobenzylidene-2-[4,7-diamino-2-(m-tolyl) - 6 - pteridinecarbonyl]hydrazine.

Example 9

To a stirred solution of 5.0 g. of o-fluorobenzamidine hydrochloride in 75 ml. of ethanol is added portionwise 5.55 g. of the silver salt of isonitrosomalononitrile. The resulting mixture is stirred for one hour and filtered. The filtrate is evaporated to dryness and the residue is refluxed for ten minutes in 50 ml. of 5-ethyl-3-methylpyridine, cooled and treated with 50 ml. of ethanol. Collection of the solid material by filtration gives 4,6-diamino-2-(o-fluorophenyl)-5-nitrosopyrimidine.

Adding 2.2 g. of ethyl cyanoacetate, then 1.5 g. of sodium ethoxide to a refluxing solution of 5.2 g. of the 2-(o-fluorophenyl)-5-nitrosopyrimidine in 300 ml. of ethanol, refluxing the resulting mixture for one hour and working up as described above yields ethyl 4,7-diamino-2-(o-fluorophenyl)-6-pteridinecarboxylate which (1 g.) is reacted with 1 g. of methylhydrazine in ethoxyethanol at reflux to give 4,7-diamino-2-(o-fluorophenyl)-6-pteridinecarboxylic acid methylhydrazide.

A mixture of 1.7 g. of n-valeraldehyde, 3.3 g. of 4,7-diamino-2-(o-fluorophenyl) - 6 - pteridinecarboxylic acid methylhydrazide, 150 ml. of methanol and 25 ml. of water is heated on a steam bath for 25 minutes. Upon cooling and filtering 1-n-pentylidene-2-[4,7-diamino-2-(o-fluorophenyl)-6-pteridinecarbonyl]-2-methylhydrazine is obtained.

Example 10

To a solution of 8.5 g. of m-aminobenzamidine hydrochloride in 150 ml. of methanol is added slowly 11.1 g. of the silver salt of isonitrosomalononitrile. The resulting mixture is stirred for one hour and filtered. The filtrate is evaporated in vacuo at 30–35° C. The residue is refluxed with a solution of 5-ethyl-2-methylpyrimidine (100 ml.) and 2-picoline (50 ml.) for 20 minutes. The mixture is cooled and diluted with water and ethanol. The precipitate is isolated by filtration and washed with ethanol to give a dark green solid, 4,6-diamino-2-(m-aminophenyl)-5-nitrosopyrimidine.

Treatment of this pyrimidine in methanol solution with methyl cyanoacetate and sodium methoxide and working up as in Example 1 gives methyl 4,7-diamino-2-(m-aminophenyl)-6-pteridinecarboxylate which (2 g.) is reacted with 3 g. of hydrazine in methoxyethanol to give the acid hydrazide.

Benzophenone (3.6 g.) is added to 3.1 g. of 4,7-diamino-2-(m-aminophenyl)-6-pteridinecarboxylic acid hydrazide, 200 ml. of ethanol and 30 ml. of water. Heating on a steam bath for 25 minutes, cooling and filtering gives 1-diphenylmethylene-2-[4,7-diamino - 2 - (m-aminophenyl)-6-pteridinecarbonyl]-hydrazine.

Example 11

Treatment of 22.0 g. of α,α,α-trifluoro-p-tolunitrile in ethanol solution with dry hydrogen chloride and then with ethanolic ammonia and working up as described above gives α,α,α-trifluorotoluamidine hydrochloride.

This hydrochloride is reacted with the silver salt of isonitrosomalononitrile in methanol solution and cyclized by refluxing with 5-ethyl-2-methylpyridine as described to give 4,6-diamino-5-nitroso-2 - (α,α,α-trifluoro-p-tolyl)-pyrimidine.

To a refluxing solution of 5.6 g. of the above prepared pyrimidine in 250 ml. of methanol is added 1.8 g. of methyl cyanoacetate and 1.2 g. of sodium methoxide. The resulting mixture is heated at reflux for one hour. The hot mixture is filtered and the crystals obtained are washed with hot water and recrystallized from dimethylformamide to give methyl 4,7-diamino-2-(α,α,α-trifluoro-p-tolyl)-6-pteridinecarboxylate which (2 g.) is treated at reflux with 1 g. of methyl hydrazine in ethoxyethanol for 1 hour to give a mixture of 4,7-diamino-2-(α,α,α-trifluoro-p-tolyl)-6-pteridinecarboxylic acid 1 - methylhydrazine and the corresponding 2-methylhydrazine.

Benzaldehyde (2.1 g.) is added to 3.7 g. of the above prepared mixture of methylhydrazide isomers in 150 ml. of ethanol and 20 ml. of water. Heating on a steam bath for 30 minutes, cooling and filtering gives 1-benzylidene - 2 - [4,7-diamino-2-(α,α,α-trifluoro-p-tolyl)-6-pteridinecarbonyl]-2-methylhydrazine.

Example 12

To a mixture of 20 g. of 6-amino-2-phenyl-4-pyrimidol and 10 ml. of dimethylaniline is added 100 ml. of phosphorus oxychloride. The resulting mixture is refluxed for eight hours, then concentrated in vacuo. The residue is poured into water and treated with an excess of concentrated ammonium hydroxide. After heating the mixture on a steam bath for one hour, concentrating in vacuo and cooling, the precipitate is filtered off, washed with water and ground in a mortar with 15 ml. of 1 N sodium hydroxide. The solid material is filtered off and washed with water to give 6-amino-4-chloro-2-phenylpyrimidine.

Ten grams of 6-amino-4-chloro-2-phenylpyrimidine and 25 ml. of 25% aqueous methylamine are heated in a bomb at 125° C. for four hours. The product, 6-amino-4-methylamino-2-phenylpyrimidine, is isolated by filtration.

A mixture of 11.4 g. of 6-amino-4-methylamino-2-phenylpyrimidine and 200 ml. of 10% acetic acid is heated to 90° C. and filtered. The solution is cooled to 3° C. and treated with a solution of 5.0 g. of sodium nitrite in 15 ml. of water added portionwise. After one hour at 0° C. and one hour at room temperature, the mixture is filtered. The solid material obtained is washed with water and dried to give 6-amino-4-methylamino-5-nitroso-2-phenylpyrimidine.

Sodium methoxide (1.2 g.) is added to a refluxing methanol solution of 4.6 g. of 6-amino-4-methylamino-5-nitroso-2-phenylpyrimidine and 1.8 g. of methyl cyanoacetate. The resulting mixture is refluxed for one hour. Working up as described gives methyl 7-amino-4-methyl-amino-2-phenyl-6-pteridinecarboxylate. This ester (500 mg.) is heated with 1 g. of methyl hydrazine in 50 ml. of ethoxyethanol for 2 hours. Cooling gives a mixture of the 1-methyl-hydrazide and the 2-methylhydrazide.

The above prepared mixture of 1- and 2-methylhydrazides is heated on a steam bath with 2.0 g. of furfural, 100 ml. of ethanol and 15 ml. of water for 20 minutes. Cooling and filtering gives 1-furfurylidene-2-(7-amino-4-methylamino - 2-phenyl-6-pteridinecarbonyl)-2-methylhydrazine.

Example 13

Substituting dimethylamine for methylamine of Example 12 gives methyl 7-amino-4-dimethylamino-2-phenyl-6-pteridinecarboxylate which is converted to the hydrazide by reaction with hydrazine in ethoxyethanol.

A mixture of 3.2 g. of 7-amino-4-dimethylamino-2-phenyl-6-pteridinecarboxylic acid hydrazide, 3.4 g. of m-trifluoromethylbenzaldehyde, 150 ml. of ethanol and 25 ml. of water are heated at 80–85° C. for 30 minutes. Cooling and filtering yields 1-(m-trifluoromethylbenzylidene - 2-(7-amino-4-dimethylamino-2-phenyl-6-pteridinecarbonyl)hydrazine.

Example 14

Replacing the p-chlorobenzamidine hydrochloride in the process of Example 3 with 7.8 g. of isonicotinamidine hydrochloride gives a mixture of 4,7-diamino-2-(4-pyridyl)-6-pteridinecarboxylic acid 1-methylhydrazide and the corresponding 2-methylhydrazide.

3-pentanone (1.7 g.) is added to 3.1 g. of 4,7-diamino-2-(4-pyridyl)-6-pteridinecarboxylic acid 1-(and 2-)methylhydrazide, 150 ml. of ethanol and 25 ml. of water. Heating on a steam bath for 20 minutes, cooling and filtering furnishes 1-(3-pentylidene)-2-[4,7-diamino-2-(4-pyridyl)-6-pteridinecarbonyl]-2-methylhydrazine.

Example 15

Replacing dibutylamine for methylamine in the process of Example 12 gives methyl 7-amino-4-dibutylamino-2-phenyl-6-pteridinecarboxylate which is reacted with excess hydrazine in ethoxyethanol to give the acid hydrazide.

Acetophenone (2.3 g.) is added to a mixture of 4.0 g. of 7-amino-4-dibutylamino-2-phenyl-6-pteridinecarboxylic acid hydrazide, 200 ml. of ethanol and 40 ml. of water. Heating on a steam bath for 25 minutes, cooling and filtering gives 1-(α-phenethylidene)-2-(7-amino-4-dibutylamino-2-phenyl-6-pteridinecarbonyl)-hydrazine.

The hydrazine (1.0 g.) is reacted with an equivalent amount of phosphoric acid in methanol to give the phosphate salt.

Example 16

To a stirred solution of 4.3 g. of m-hydroxybenzamidine hydrochloride in 100 ml. of ethanol is added slowly 5.55 g. of the silver salt of isonitrosomalononitrile. The resulting mixture is stirred for one hour and filtered. The filtrate is evaporated to dryness and the residue is refluxed for ten minutes with 50 ml. of 5-ethyl-2-methylpyridine, then treated with 50 ml. of ethanol. Collection of the solid material by filtration gives 4,6-diamino-2-(m-hydroxyphenyl)-5-nitrosopyrimidine.

Treatment of the above prepared pyrimidine (2.3 g.) in refluxing methanol solution with 0.93 g. of methyl cyanoacetate and 0.59 g. of sodium methoxide and working up as described gives methyl 4,7-diamino-2-(m-hydroxyphenyl)-6-pteridinecarboxylate which (1 g.) is reacted with 1 g. of methylhydrazine in ethoxyethanol to give, upon cooling, a mixture of the 1-methylhydrazide and 2-methylhydrazide.

A mixture of 3.3 g. of the above prepared methylhydrazides, 2.9 g. of p-methoxyphenylacetaldehyde, 200 ml. of ethanol and 30 ml. of water is heated on a steam bath for 25 minutes to separate, on cooling, 1-[β-(p-methoxyphenyl)ethylidene]-2-[4,7-diamino-2-(m-hydroxyphenyl)-6-pteridinecarbonyl]-2-methylhydrazine.

Example 17

Substituted 14.0 g. of m-bromobenzamidine hydrobromide for the p-chlorobenzamidine hydrochloride in the process of Example 3 gives methyl 4,7-diamino-2-(m-bromophenyl)-6-pteridinecarboxylate which is reacted with excess hydrazine to give the acid hydrazide.

A mixture of 3.7 g. of 4,7-diamino-2-(m-bromophenyl)-6-pteridinecarboxylic acid hydrazide, 10 ml. of acetaldehyde, 150 ml. of ethanol and 25 ml. of water is heated on a steam bath for 20 minutes. After cooling and filtering 1-ethylidene-2-[4,7 - diamino-2-(m-bromophenyl)-6-pteridinecarbonyl]-hydrazine is obtained.

Example 18

To a mixture of 6.2 g. of 4,7-diamino-2-phenyl-6-pteridinecarboxylic acid 1-(and 2-)methylhydrazide (prepared as in Example 1), 150 ml. of methanol and 25 ml. of water is added 5.2 g. of p-tolylacetaldehyde. Heating the resulting mixture at 85° C. for 15 minutes, cooling and filtering gives 1-[β-(p-tolyl)ethylidene]-2-(4,7-diamino-2-phenyl-6-pteridinecarbonyl)-2-methylhydrazine.

Reacting the hydrazine with an equivalent amount of sulfuric acid in ethanol and evaporating the solvent gives the sulfate salt.

Example 19 o-Hydroxybenzaldehyde (2.3 g.) is added to a mixture of 3.1 g. of 4,7-diamino-2-phenyl-6-pteridinecarboxylic acid methylhydrazide (made as in Example 1), 200 ml. of ethanol and 30 ml. of water. The mixture is heated on a steam bath for 10 minutes then cooled and filtered to give 1-(o-hydroxybenzylidene)-2-(4,7-diamino-2-phenyl-6-pteridinecarbonyl)-2-methylhydrazine.

Example 20

To a mixture of 3.0 g. of 4,7-diamino-2-phenyl-6-pteridinecarboxylic acid hydrazide (prepared as in Example 2) in 125 ml. of ethanol and 25 ml. of water is added 2.4 g. of m-aminobenzaldehyde. Heating on a steam bath for 25 minutes, cooling in ice and filtering gives 1-(m-aminobenzylidene)-2-(4,7-diamino-2-phenyl-6-pteridinecarbonyl)hydrazine.

When the above described reaction is carried out using 3.6 g. of p-bromobenzaldehyde in place of the m-aminobenzaldehyde, 1-(p-bromobenzylidene)-2-(4,7-diamino-2-phenyl-6-pteridinecarbonyl)hydrazine.

Example 21

A mixture of 3.2 g. of di-2-furylketone, 3.1 g. of 4,7-diamino-2-phenyl-6-pteridinecarboxylic acid methylhydrazide, 150 ml. of ethanol and 30 ml. of water is heated on a steam bath for 30 minutes. Cooling and filtering yields 1-(di-2-furylmethylene)-2-(4,7-diamino-2-phenyl-6-pteridinecarbonyl)-2-methylhydrazine.

Example 22

A solution of 2.0 g. of 2-phenyl-4,6-diamino-5-nitrosopyrimidine and 0.7 g. of malononitrile in 30 ml. of pyridine is heated at 90–95° C. for four hours. The resulting reaction mixture is then evaporated in a rotating flash evaporator to half volume and diluted with 100 ml. of water. The yellow crystalline solid which separates is collected by filtration, washed with water and recrystallized from aqueous dimethylformamide to give 2-phenyl-4,7-diamino-6-cyanopteridine, M.P. >360° C.

A suspension of 1 g. of 2-phenyl-4,7-diamino-2-cyanopteridine in 100 ml. of anhydrous ethanol with 1 g. of hydrazine is heated at reflux until a clear red solution results. The mixture is cooled and water added to separate a yellow solid, 2-phenyl-4,7-diamino-6-pteridineamidrazone, M.P. 287° C. (dec.), after recrystallization from aqueous dimethylformamide following initial extraction of crude product with boiling ethanol.

A suspension of 1 g. of 2-phenyl-4,7-diamino-2-cyanopteridine in 100 ml. of anhydrous ethanol with 1 g. of N-methylhydrazine is heated at reflux. Cooling and the addition of water gives a yellow solid, 2-phenyl-4,7-diamino-6-pteridine-1(and 2)-methylamidrazone. The crude product is purified by extraction with boiling ethanol and recrystallized from aqueous dimethylformamide.

Benzaldehyde (2.1 g.) is added to 3.1 g. of the above prepared mixture of 1(and 2)-methylamidrazone in 150 ml. of ethanol and 25 ml. of water. The resulting mixture is heated on a steam bath for 20 minutes, then cooled and filtered to give 1-benzylidene-2-(4,7-diamino-2-phenyl-6-pteridinecarboximidoyl)-2-methylhydrazine.

Example 23

To a stirred solution of 9.55 g. of p-chlorobenzamidine hydrochloride in 200 ml. of methanol is added, slowly, 11.1 g. of the silver salt of isonitrosomalononitrile. The resulting mixture is stirred for one hour and filtered. The filtrate is evaporated to dryness at 30–35° C. To the residue is added 150 ml. of a solution of 5-ethyl-2-methylpyridine and 2-picoline (2:1). The resulting solution is refluxed for 20 minutes. Addition of water and ethanol precipitates a dark green solid which is isolated by filtration and washed with ethanol to give 4,6-diamino-2-(p-chlorophenyl)-5-nitrosopyrimidine.

A mixture of 2.5 g. of the nitroso compound and 0.7 g. of malononitrile in 50 ml. of pyridine is heated at reflux for six hours. After evaporation and quenching, the desired 2-(p-chlorophenyl)-4,7-diamino-6-cyanopteridine is obtained which (500 mg.) is heated in 500 ml. of ethanol with 1 g. of hydrazine to form the amidrazone after evaporation and quenching with water.

A mixture of 2.0 g. of 4,7-diamino-2-(p-chlorophenyl-6-pteridineamidrazone, 25 ml. of acetone, 100 ml. of ethanol and 20 ml. of water is heated on a steam bath for 25 minutes. Cooling and filtering gives 1-isopropylidene-2-[4,7-diamino-2-(p-chlorophenyl) - 6 - pteridinecarboximidoyl]hydrazine.

Example 24

To a solution of 7.94 g. of p-toluamidine hydrochloride in 80 ml. of methanol is added 11.1 g. of the silver salt of isonitrosomalononitrile. The mixture is stirred for 45 minutes, filtered and concentrated to dryness in vacuo at 30–40° C. The residual yellow crystals are boiled with 50 ml. of 5-ethyl-2-methylpyridine for ten minutes. The mixture is cooled and treated with ethanol. The precipitate is filtered off and washed with ethanol and ether to give 4,6-diamino-5-nitroso-2-(p-tolyl)-pyrimidine, M.P. 279–280° C. (dec.).

A mixture of 1.2 g. of the pyrimidine and 0.4 g. of malononitrile in 30 ml. of pyridine is heated at 95° C. for three hours. The evaporated reaction mixture is diluted with water to separate 2-(p-tolyl)-4,7-diamino-6-cyanopteridine. This compound (500 mg.) in ethanol is heated with isopropylhydrazine (500 mg.) to form the N-isopropylamidrazone upon quenching.

Reacting the above prepared isopropylamidrazone with excess benzaldehyde in aqueous ethanol as in Example 22 gives 1 - benzylidene - 2 - [4,7 - diamino - 2 - (p - tolyl)-6-pteridinecarboximidoyl-2-isopropylhydrozine.

Example 25

To a stirred solution of 5.7 g. of o-butoxybenzamidine hydrochloride in 75 ml. of ethanol is added portionwise 5.55 g. of the silver salt of isonitrosomalononitrile. The resulting mixture is stirred for one hour and filtered. The filtrate is evaporated to dryness and the residue is refluxed for ten minutes in 50 ml. of 5-ethyl-2-methylpyridine, cooled and treated with 50 ml. of ethanol. Collection of the solid material by filtration gives 4,6-diamino-2-(o-butoxyphenyl)-5-nitrosopyrimidine.

A mixture of 2.9 g. of the nitrosopyrimidine and 0.7 g. of malononitrile in 75 ml. of pyridine is heated at 65–70° C. for eight hours. The reaction mixture is evaporated and quenched with water to separate 2-(o-butoxyphenyl)-4,7-diamino-6-cyanopteridine. The pteridine (750 g.) is heated at reflux in ethanol with an excess of hydrazine to give the amidrazone by the addition of water.

Reacting the above prepared amidrazone with excess p-chlorobenzaldehyde in aqueous ethanol by heating on a steam bath for 20 minutes yields 1-p-chlorobenzylidene-2 - [4,7 - diamino - 2 - (o - butoxyphenyl) - 6 - pteridinecarboximidoyl]hydrazine.

Similarly by using m-bromobenzamidine hydrobromide in the above reaction and reacting the resulting intermediate amidrazone with excess benzaldehyde, 1-benzylidene - 2 - [4,7 - diamino - 2 - (m - bromophenyl) - 6-pteridinecarboximidoyl]hydrazine is obtained.

Example 26

6 - amino - 4 - methylamino - 5 - nitroso - 2 - phenyl-pyrimidine (2.6 g.), prepared as in Example 12, is reacted with 0.8 g. of malononitrile in 100 ml. of pyridine. Concentrating, adding water and filtering gives 2-phenyl-7-amino-4-methylamino-6-cyanopteridine. This compound (500 mg.) in methanol is reacted with 1 g. of hydrazine to give, upon quenching, the desired amidrazone.

Heating a mixture of 3.0 g. of 7-amino-4-methylamino-2-phenyl-6-pteridineamidrazone, 2.1 g. of benzaldehyde, 150 ml. of ethanol and 25 ml. of water at 85° C. for 25 minutes, cooling and filtering gives 1-benzylidine -2-(7-amino - 4 - methylamino - 6 - pteridinecarboximidoyl)-hydrazine.

Example 27

Substituting isonicotinamidine hydrochloride for p-chlorobenzamidine hydrochloride in the process of Example 23 gives 4,7-diamino-2-(4-pyridyl)-6-pteridineamidrazone.

Furfural (2.5 g.) is added to an aqueous ethanol solution of 1.5 g. of the above prepared amidrazone. Heating on a steam bath for 20 minutes, cooling and filtering gives 1 - furfurylidine - 2 - [4,7 - diamino - 2 - (4 - pyridyl)-6-pteridinecarboximidoyl]-hydrazine.

What is claimed is:

1. A chemical compound selected from the group consisting of a free base and its nontoxic, pharmaceutically acceptable, acid addition salts, said free base having the formula:

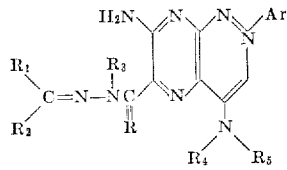

in which Ar is a member selected from the group consisting of

thienyl and pyridyl; R is a member selected from the group consisting of O and NH; $R_1$ is a member selected from the group consisting of hydrogen, lower alkyl,

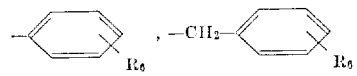

and furyl; $R_2$ is a member selected from the group consisting of lower alkyl,

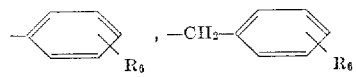

and furyl; $R_3$, $R_4$ and $R_5$ are members selected from the group consisting of hydrogen and lower alkyl; and $R_6$ is a member selected from the group consisting of hydrogen, chloro, bromo, fluoro, methyl, methoxy, trifluoromethyl, hydroxy and amino.

2. A chemical compound having the formula:

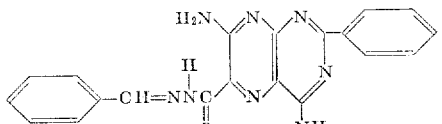

3. A chemical compound having the formula:

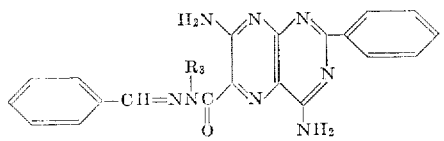

in which $R_3$ is lower alkyl.

4. A chemical compound having the formula:

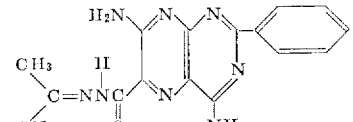

5. A chemical compound having the formula:

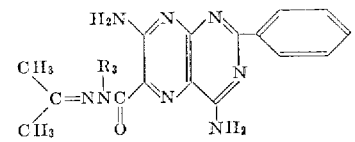

in which $R_3$ is lower alkyl.

References Cited in the file of this patent
UNITED STATES PATENTS 2,963,480     Taylor et al.             Dec. 6, 1960

OTHER REFERENCES

Yale et al.: J. Amer. Chem. Soc., volume 75 (1953), pages 1933–42, page 1933 relied on.

UNITED STATES PATENT OFFICE
CERTIFICATE OF CORRECTION

Patent No. 3,111,520                        November 19, 1963

Joseph Weinstock

It is hereby certified that error appears in the above numbered patent requiring correction and that the said Letters Patent should read as corrected below.

Column 11, lines 32 to 39, the structural formula should appear as shown below instead of as in the patent:

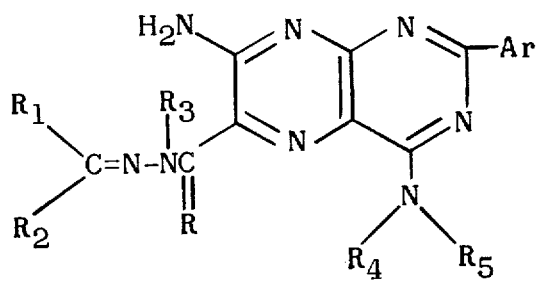

Signed and sealed this 19th day of May 1964.

(SEAL)
Attest:

ERNEST W. SWIDER                      EDWARD J. BRENNER
Attesting Officer                   Commissioner of Patents